US010505871B1

United States Patent
Jain

(10) Patent No.: US 10,505,871 B1
(45) Date of Patent: Dec. 10, 2019

(54) FUTURE MESSAGING MAXIMIZING CONTEXTUAL RELEVANCY AND MINIMIZING INFORMATION OVERLOAD BASED DISTRACTIONS

(71) Applicant: Sandeep Jain, Davie, FL (US)

(72) Inventor: Sandeep Jain, Davie, FL (US)

(*) Notice: Subject to any disclaimer, the term of this patent is extended or adjusted under 35 U.S.C. 154(b) by 189 days.

(21) Appl. No.: 15/827,172

(22) Filed: Nov. 30, 2017

(51) Int. Cl.
*H04L 12/58* (2006.01)

(52) U.S. Cl.
CPC .............. *H04L 51/04* (2013.01); *H04L 51/12* (2013.01); *H04L 51/24* (2013.01); *H04L 51/28* (2013.01)

(58) Field of Classification Search
CPC ...... G06Q 30/02; G06Q 10/10; G06Q 10/107; G06Q 10/109; G06Q 10/0633; G06Q 40/04; H04L 51/14; H04L 51/00; H04L 51/12; H04L 51/18; H04L 51/26; H04L 51/38; H04L 51/24; H04L 51/34; H04L 51/04; H04L 51/16; H04L 51/22; H04L 51/30; H04L 67/26; H04L 67/306; H04L 67/325; H04L 29/06; H04L 51/02; H04L 51/32; H04L 51/36; H04L 67/12; H04L 67/16; H04L 67/18; H04L 67/24; H04L 67/28; H04L 67/2842; H04L 67/2861; H04L 67/322; H04L 67/327; H04L 67/36; H04L 69/329; H04L 9/3215; H04M 2203/2083; H04M 2203/301; H04M 2242/22; H04M 3/38; H04M 3/42059; H04M 3/436; H04M 3/533; H04M 3/53316; H04M 3/53325; H04M 3/53333; H04M 3/54; H04M 1/72552; H04M 1/72566; H04M 3/537; H04W 4/021; H04W 4/12

See application file for complete search history.

(56) References Cited

U.S. PATENT DOCUMENTS

| | | | | |
|---|---|---|---|---|
| 3,826,876 A * | 7/1974 | Gueldenpfenning | . | H04M 3/436 379/188 |
| 5,684,862 A * | 11/1997 | Finnigan | ............... | H04M 3/533 379/207.03 |
| 7,034,691 B1 * | 4/2006 | Rapaport | ............... | G06Q 10/10 340/573.1 |
| 7,519,676 B2 * | 4/2009 | Horvitz | ............... | G06Q 10/109 709/204 |

(Continued)

*Primary Examiner* — Greg C Bengzon
(74) *Attorney, Agent, or Firm* — Patents on Demand P.A.; Brian K. Buchheit

(57) ABSTRACT

A messaging server with a future message storage space for future messages, each being a sender created message not yet delivered to a recipient that has an associated sender specified message delivery time. Recipient specific delivery block details are specified for a set of delivery blocks for future messages. The future messages are received processed and stored. Until the respective sender specified message delivery time a respective one of the set of senders is able to retract and edit a corresponding one of the future messages. Future messages are delivered at the delivery time consistent with the delivery blocks. After delivery the sender is unable to retract and edit a corresponding delivered message. Future messages do not alert a recipient of arrival until the sender established delivery time, which minimizes cognitive distractions and provides the sender with notice for anticipating a time of response, without overly distracting the recipient.

16 Claims, 6 Drawing Sheets

(56) References Cited

U.S. PATENT DOCUMENTS

| | | | | |
|---|---|---|---|---|
| 7,844,666 B2* | 11/2010 | Horvitz | ................ | G06Q 10/107 709/206 |
| 8,171,092 B2* | 5/2012 | Lee | ...................... | H04L 67/306 709/206 |
| 8,233,943 B1* | 7/2012 | Othmer | ................... | G06F 9/542 379/207.16 |
| 8,296,384 B2* | 10/2012 | Pattan | .................. | G06Q 10/109 709/206 |
| 9,235,547 B1* | 1/2016 | Hartman, II | ............ | H04L 51/14 |
| 2002/0156854 A1* | 10/2002 | Matsumoto | .......... | G06Q 10/107 709/206 |
| 2004/0078231 A1* | 4/2004 | Wilkes | .................. | G06F 19/325 705/2 |
| 2004/0111478 A1* | 6/2004 | Gross | ..................... | H04L 51/00 709/206 |
| 2004/0122900 A1* | 6/2004 | Pous | .................... | G06Q 10/107 709/206 |
| 2004/0254998 A1* | 12/2004 | Horvitz | ................ | G06Q 10/107 709/206 |
| 2005/0010644 A1* | 1/2005 | Brown | ................. | G06Q 10/107 709/206 |
| 2005/0169443 A1* | 8/2005 | Rosenthal | .............. | H04M 11/10 379/88.17 |
| 2005/0188037 A1* | 8/2005 | Hamaguchi | .......... | G06Q 10/107 709/206 |
| 2005/0193076 A1* | 9/2005 | Flury | ..................... | H04L 51/12 709/206 |
| 2005/0267937 A1* | 12/2005 | Daniels | ............... | G06Q 10/107 709/206 |
| 2006/0010215 A1* | 1/2006 | Clegg | ................... | G06Q 10/107 709/206 |
| 2006/0031086 A1* | 2/2006 | Miles | ..................... | G06Q 10/00 715/810 |
| 2006/0059238 A1* | 3/2006 | Slater | ................... | G06Q 10/107 709/206 |
| 2006/0242246 A1* | 10/2006 | Lyle | ....................... | G06Q 10/10 709/206 |
| 2007/0055733 A1* | 3/2007 | Maruyama | ............ | H04L 51/00 709/206 |
| 2007/0061423 A1* | 3/2007 | Accapadi | ............. | G06Q 10/107 709/219 |
| 2007/0064883 A1* | 3/2007 | Rosenthal | .............. | H04L 12/14 379/67.1 |
| 2008/0196092 A1* | 8/2008 | Benschop | ................ | G06Q 20/10 726/5 |
| 2009/0055489 A1* | 2/2009 | Agarwal | ............. | G06Q 10/107 709/206 |
| 2009/0055490 A1* | 2/2009 | Agarwal | .............. | G06Q 10/107 709/206 |
| 2009/0055491 A1* | 2/2009 | Agarwal | ................ | G06Q 10/10 709/206 |
| 2009/0055502 A1* | 2/2009 | Agarwal | ................ | G06Q 10/107 709/207 |
| 2009/0125914 A1* | 5/2009 | Jung | ....................... | G06Q 30/02 719/313 |
| 2009/0191848 A1* | 7/2009 | Helferich | ............ | H04L 12/6418 455/412.1 |
| 2010/0113066 A1* | 5/2010 | Dingler | ................. | H04W 4/021 455/456.3 |
| 2011/0219315 A1* | 9/2011 | Bier | ....................... | G06Q 10/10 715/752 |
| 2011/0289162 A1* | 11/2011 | Furlong | ................. | H04L 51/12 709/206 |
| 2012/0210334 A1* | 8/2012 | Sutedja | ................ | G06Q 10/107 719/314 |
| 2013/0117392 A1* | 5/2013 | Aceves | .................... | H04L 51/30 709/206 |
| 2013/0166657 A1* | 6/2013 | Tadayon | ........... | H04M 1/72552 709/206 |
| 2013/0212185 A1* | 8/2013 | Pasquero | ............... | G06Q 10/10 709/206 |
| 2013/0263014 A1* | 10/2013 | Chalak | ................. | G06Q 10/107 715/752 |
| 2014/0293788 A1* | 10/2014 | Ibasco | .................... | H04W 4/12 370/235 |
| 2014/0359036 A1* | 12/2014 | Blakers | .................. | H04L 51/26 709/206 |
| 2015/0134343 A1* | 5/2015 | Kluger | .................... | A61B 5/0022 705/2 |
| 2015/0381571 A1* | 12/2015 | Plasse | .................... | H04L 51/00 726/26 |
| 2016/0164819 A1* | 6/2016 | Shrivastava | ............ | H04L 51/24 709/206 |
| 2016/0182434 A1* | 6/2016 | Systrom | ................. | H04L 51/32 709/206 |
| 2016/0191453 A1* | 6/2016 | Thomas | .................. | H04W 4/12 709/206 |
| 2016/0261549 A1* | 9/2016 | Freed | ...................... | H04L 51/34 |
| 2017/0005971 A1* | 1/2017 | Kumar | .................... | H04L 51/18 |
| 2017/0272504 A1* | 9/2017 | Cahill | .................. | G06F 16/387 |
| 2017/0289088 A1* | 10/2017 | Quintero | ................ | H04L 51/08 |
| 2018/0152403 A1* | 5/2018 | Charignon | ............. | H04L 51/16 |
| 2019/0132437 A1* | 5/2019 | Fenoglio | ................. | H04W 4/12 |
| 2019/0147403 A1* | 5/2019 | Lawrence | ............. | G06Q 10/107 705/1.1 |
| 2019/0173968 A1* | 6/2019 | Yue | ........................ | H04L 51/24 |
| 2019/0222547 A1* | 7/2019 | Penilla | ................... | H04W 4/12 |

* cited by examiner

Delivery Block /405

Block Identifier: Block ABC /411
Block Name: Evening Delivery /413
Time: 4:00-5:00 PM EST /415
Days: MTWF /417
Reoccurring: YES /419
Sender Condition(s): Physician /421
3rd Party Condition(s): Shared Patient /423
MessageTypeCondition(s): Casual /425
Context/SubjectConditions(s): Patient Health /427
TextContextCondition(s): none /429
AppendixCondition(s): Chart /431

Future Message List /435

List Identifier: List ABC /437
List Scope: Children's Health Group /439
Delivery Address: Selected Recipient and Group Default /441
Additional Forward: Recipient Default SMS /443
Read Receipt: Disabled /445
Read Requirements: Within 1 Day of Delivery Else Escalate /447
Auto Delete Defaults: 2 Days after Read /449
Custom Rules: Rules XYZ /451

Message Specific Settings /455

Message Identifier: Message ABC /457
SENDER: /459
    Delivery Address: Only Recipient /461
    No Replies /463
    AutoDelete Immediate Upon Read Before Delivery /465

RECIPIENT: /467
    Additional Forward: recipient@email.com /469
    Message Rule: Rule SX /471

FIG. 4B

FUTURE MESSAGING MAXIMIZING CONTEXTUAL RELEVANCY AND MINIMIZING INFORMATION OVERLOAD BASED DISTRACTIONS

BACKGROUND

The present invention relates to the field of messaging and, more particularly, to future messaging that maximizes contextual relevancy and minimizes information overload-based distractions.

Mobile devices have revolutionized the manner in which people are able to communicate, to share documents and photographs, to access internet and intranet content, and the like. Mobile device communications are rapid and easy to use, which results in large volumes of messages being sent/received and results in expectations of fast responses. Unlike other communications, which require a higher threshold of effort on the part of sender, which can result in more thoughtful expressions, short text messages are able to be sent at a whim, with little effort, contemplation, or thought. A sender of a text message, often expects a response within an hour of having sent a message; else the sender perceives a recipient is unhappy with the sender for some reason or another. These rapid expectations for message response combined large volumes of these types of messages results in regular interruptions, which can be highly distracting from a cognitive standpoint. Additionally, if messages accumulate the nature of the conventional interfaces results in a high-likelihood of important messages being ignored or being lost in a pile of messages of little import. On mobile devices, texts are by default organized by time of receipt, which results in many important messages being rapidly hidden from a first screen of a mobile device, which is small. It is easy to overlook and forget these messages, which aggravates senders anticipating quick responses. Academics have begun to report negative effects on attention span, on instant gratification, on increasingly shallow core relationships and communications; all symptoms of mobile device addiction that is increasingly problematic in society.

The above negatives are particularly problematic in the context of targeted professional services, such as medical services, legal services, teaching services, and the like. Providers of professional services are heavily dependent on being presented with accurate, thoughtful information and context, upon which important decisions are made. Further, professional service communications, unlike causal personal messages, generally are sought based on a subject of specialty for which a professional has mastery. A consciousness professional often cannot properly express a professional opinion without reviewing a subject and carefully crafting a response that won't be misunderstood by the message sender, which depends on the sophistication of the sender in a specific subject area. A physician can communicate a matter to another physician in a short targeted fashion, for example, where a more nuanced and expansive message may be required when communicating the same content to a patient. In an increasingly mobile society, having the right information available "at your fingertips" is revolutionary. Challenges facing professional communications, which by nature require more information and deeper cognitive thought than required of casual interpersonal texting, have resulted in existing communication applications being unsuitable for professional service. Thus, the revolutionary advantages of maximizing information and communication accessibility from mobile devices for professional services has proven to be highly illusive. The capabilities of conventional mobile communication solutions simply have more disadvantages than benefits, and fail to have features tailored to unique professional environments and needs.

For example, physicians often have patients at many different hospitals. The patients are seen by nurses, and other physicians. Patients undergo many tests and treatments and their bodies have numerous reactions both expected and unanticipated. Various levels of professionals heavily document client changes in formal systems. Formal records are subject to review, are often subject to privileges (i.e., attorney client privilege) and may be subject to numerous regulations, such as Health Insurance Portability and Accountability Act (HIPA). Moreover, formal records are subject to discovery in lawsuits and professional reviews, which makes accuracy of records essential and makes speculation and informal commentary on the record unadvised. Formal records are often dense and difficult for decision making professionals to rapidly digest for a targeted context. Professionals are often busy and handle many clients/patients/students. Professionals also coordinate services with many other busy professionals. A physician on rounds, for example, may be handling tens of patients at a hospital location, some of which are patients of other physicians for whom the round making one is assisting. The distracting, time consuming, and cognitive drain required by conventionally responding to text messages in real time is ill-advised for a physician conducting rounds. Worse, the formal record keeping requirements disfavors the rapid, responses often "off the cuff" ones promoted when conventionally text messaging from mobile devices.

For all of the above reasons, use of real-time targeted communications for professional functions is rare. What is needed is contextual communication that minimizes distractive cognitive overhead while retaining traditional communication benefits. What is also needed is a way to adjust sender expectations in real-time text communication timeliness, while highlighting the most important messages to recipients.

BRIEF DESCRIPTION OF THE SEVERAL VIEWS OF THE DRAWINGS

FIG. 4B shows a delivery block, a future message list, and a set of message specific settings used by a future messaging system in accordance with an embodiment of the disclosure.

DETAILED DESCRIPTION

Figure 1:
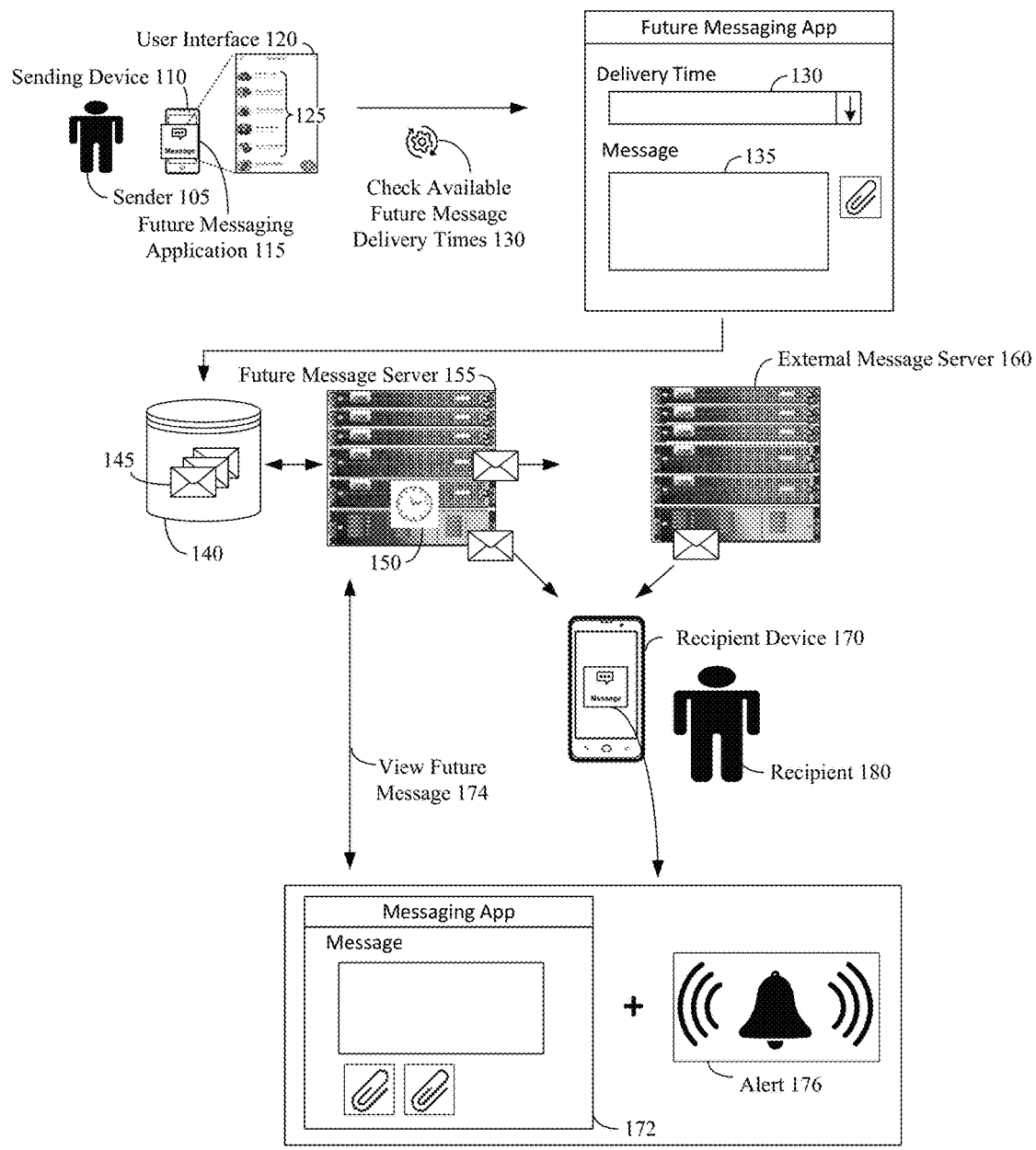
FIG. 1 shows an overview of a future messaging delivery system in accordance with embodiments of the disclosure.

Embodiments of the disclosure are directed to future messaging for mobile devices. In the disclosure, a sender of a message selects a recipient and before sending a message is provided a set of future times for delivery of the message, as established by a recipient. The times presented for delivery may depend on additional context information, which the sender inputs. The sender's message to be delivered at a future time is referred to as a future message. Until a message delivery time, the sender may update, change, aggregate, or retract the message. Further, message aggregations (sent at different times) can be coordinated to be presented concurrently to a recipient at the designed future delivery time.

Future messages are viewable by recipients before the delivery time, via a specialized section of a communication interface called a future message section. Unlike, normal messages, no notification or alert is presented when a future message is sent and is viewable by a recipient. If a future message is viewed before the time of delivery, delivery and update options available to the sender(s) may change. Once the time of delivery occurs, a future message is delivered to the normal message section of the messaging application, and disappears from the specialized future message section. A recipient is alerted or notified of a recipient of the message at the time of delivery. Assuming messages in the normal section are organized or sorted by time, the message delivery time controls.

Future messaging is intended to be integrated within a professional communication context in embodiments. For example, a physician (or other professional) establishes a set of times that constrain the delivery of messages. Different times may be established for different roles of users. For example, office staff may be presented with additional time blocks for delivery of messages than patients. Physician partners may also have time blocks accessible that are lacking to others. Context can be integrated to determine which time blocks are available, as well. For example, a first physician may be provided time blocks that correspond to a receiving physician's rounds. For a patient centric communication, the time blocks shown to the receiving physician are those that correspond to round times when that physician may be near that patient. If a different physician covers for the receiving physician, the future message related to the patient is redirected and the first physician is informed. The different physician can respond to the message, which provides the response back to the first physician. When the time for "rounds" occurs, the treating physician is receives all the deferred messages (i.e., scheduled future messages for delivery at time of rounds) related to the patients. Additional patient-specific information is presented and organized near the messages, in one embodiment. The delivery at designated times helps protect patient information so that only the appropriate physician receives it. The receiving physician only receives relevant information at a time that is convenient. Delivery at a recipient established time ensures cognitive distraction load is minimized in the professional context for the receiving physician. Further, a physician having "extra" time, may view future messages and communicate at his/her convenience, which maximizes responsiveness while minimizing distraction.

As will be appreciated by one skilled in the art, aspects of the present invention may be embodied as a system, method, downloadable device app, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The program code may also execute at least in part on a smart phone, tablet, gaming console, smart consumer electronic device, or embedded device. In a hybrid processing scenario where program code executes partially on a client and partially on at least one remote computers, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an overview of a future messaging delivery system in accordance with embodiments of the disclosure. In FIG. 1, a sender 105 with sending device 110 accesses a user interface 120 of future messaging application 115. From within the user interface 120, one of a set of possible recipient accounts 125 is selected. Each recipient account 125 represents an account within future message server 155 to which messages are able to be saved and stored. Often recipient accounts 125 are defined by recipient name or by an alias. For example, a recipient account 125 can be a personal account for an individual, can be a professional account for an individual, or can be a group account for a service group.

Once a recipient account 125 is selected, a check 130 is performed to determine what, if any, future message time delivery blocks have been established. A recipient 180 having a recipient account 125 is permitted to establish zero or more delivery blocks, which control a timing of message delivery to the recipient account 125. A future message list of the future message server 155 is an artifact used to record the delivery blocks established by the various recipients. The future message server 155 provides the appropriate (the ones available to the sender 105 for the message of user interface 120, per recipient 180 established rules/conditions) times available for delivery to the user interface 120. These selectable delivery times 130 are displayed and selectable by sender 105. After selecting from among the permitted delivery times 130, the sender 105 enters a message 135 for delivery. The message 135 may include text, graphics, multi-media, documents, and the like. The message is saved in a data store 140 for future messages 145. Future messages 145 are not conveyed to the recipient 180 until the delivery time 130. Lack of delivery of the message ensures that no alert or notice is conveyed to the recipient until the delivery time 130 occurs.

In one embodiment, however, a recipient 180 using the future messaging application can use an interface 172 to view the future messages 174 from a special section of the interface, which is distinct from the normal messages. The future message 174 is not categorized or indexed to delivered messages and is not viewable without accessing the future message server 155. An ability to view future messages 145 provides a mechanism allowing recipient 180 to seek messages if, and only if, the recipient 180 has unexpected time. The sender 105 is not anticipating/expecting the recipient 180 to respond until sometime after the delivery time 130. Accordingly, recipients 180 do not suffer the "cognitive load" of being bombarded with messages for which responses are expected, which is typical of modern real-time communication mechanisms. A sender 105 can modify, retract, and aggregate future messages 145 until delivery and/or until the recipient 180 has read them.

The future message server 155 includes a clock 150, which detects when the delivery time occurs, at which point the message 145 is delivered to the recipient device 170 and/or an external message server 160. Delivery of the message 145 products an alert 176, notification, or alarm and contents of the message 145 itself. The recipient device 170 is a device used by recipient 180, which includes the future messaging application and interface 172. In one embodiment, a primary or default sorting criteria for delivered messages, as displayed within the user interface 172, is the delivery time. Additional (non-default) filters, sort criteria, or ordering are available from the user interface 172 in embodiments.

Various user interfaces are shown in the figures of the disclosure. Since the USPTO prefers black and white figures, color coded user interface elements, which are contemplated for ease of use, are not able to be easily shown. Additionally, mobile device user interfaces are typically optimized for small screen sizes so touch-based and flyover enhancement as well as tabbed screens are contemplated. For illustrative and descriptive purposes (within USPTO constraints) some screens as shown include information to explain functionality and the concepts; although layout considerations on small devices, such as phones, will likely result in implementation alterations from what is shown. Voice user interfaces (VUI) and voice-based interface elements are contemplated, yet are challenging to visually show in a static black and white depiction. For example, instead of textually entering a message (or being presented with one) a microphone of a device can capture voice input and translate it into text input (or a speaker can audibly present message content to a user). In short, simplified user interfaces are shown and detailed while one of ordinary skill should recognize that derivatives to these user interfaces, especially those derivatives relating to color coding, screen optimization, and the like, are considered by the innovators and are to be considered as being within scope of the disclosure.

FIGS. 2A, 2B, 2C, and 2D show a sender's user interface for a future messaging application in accordance with an embodiment of the disclosure. In the user interface, a presented set of message recipients 210 are shown. Each message recipient is one previously entered into a user's contact list or otherwise indexed/listed by a future message server and made available to the user. In the interface, each user is a professional contact, where other contacts are contemplated that may be filtered by contact type. Professional contacts may send non-professional (personal) messages or professional ones. Users can distinguish these messages using a selection/de-selection of the check box 212. Personal messages will likely lack additional elements (such as those shown by interface elements 214, 216, and 218). Therefore, the user interface can dynamically expand and show elements 214, 216, and 218 only when a professional message for a contact is indicated. Otherwise, space of the screen is saved. Generally, the user interface elements of the disclosure are able to dynamically change depending on a type of message being submitted in contemplated embodiments. Context dependent hiding/unhiding of element is contemplated. Elements 214, 216, and 218 are illustrative and are intended to vary for different implementations. Some of elements 214, 216, and 218 are optional while others are mandatory.

Professional messages include a set of context specific elements, which are relevant for the future messaging functionality. One such element can include a message type 214. One message type 214 is for a casual message, which is a message that is informal and intended to be excluded from a formal professional record. Casual messages may be automatically deleted after a set time and/or upon being read, which emphasizes the informal nature of the communications and ensures an enhanced level of confidentiality and privacy. Another message type is a formal message, which is intended to be retained and/or added to a formal professional record. In one embodiment, formal messages are subject to billing and may be annotated for invoicing purposes.

Both formal and casual messages can relate to a third party subject 216. In context of the medical profession, typical third party subjects include patients. The third party subject is a subject to which the message being sent is directed. In embodiments, the selected parties can default to a dynamically generated list from a back-end system that shows common patients between the interface user (e.g., device owner) and the selected recipient. Thus, the subjects presented in a pull-down of interface element 216 dynamically varies depending on which message recipient (e.g., Dr. Smyth, Turner, or Zatrich) is selected. Additional patients, not enumerated or available through a selection list, can be manually entered.

A context section 218 depicts specific enumerated categories for which a future message applies. The context can apply to patient health, patient allergies, patient observations, nurse reports, patient histories, and the like. The context(s) of section 218 vary based on the type of professional services for which messages apply (if any) and based on patient and other specific factors. Once a recipient is selected and additional elements input, a message is able to be initiated, as indicated by the initiate message button 220, which triggers presentation of a delivery block section screen, such as that of FIG. 2B.

Figure 2A:
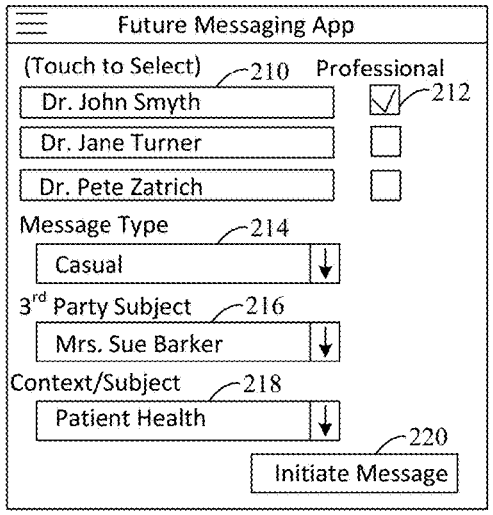
FIGS. 2A, 2B, 2C, and 2D show a set of sender user interfaces for a future messaging application in accordance with an embodiment of the disclosure.
Figure 2B:
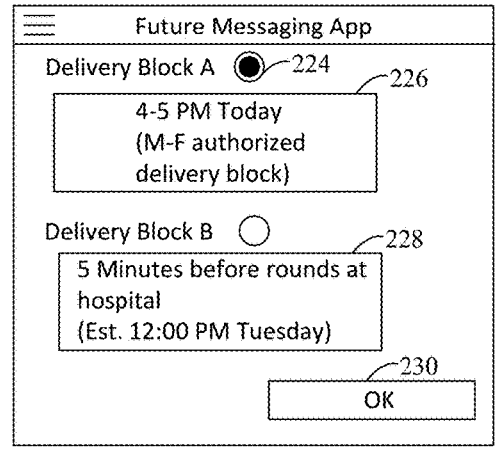

FIG. 2B shows a user interface that permits a sender to select a future delivery time based on recipient established delivery blocks. A recipient is permitted to specify a number of different delivery blocks for incoming messages and to establish conditions (if any) for each of the blocks. The conditions must match message context, which is able to be determined from user input elements such as elements 212, 214, 216, and 218. One of the presented delivery blocks 224 and 228 is able to be selected, by selecting a radio button or some other GUI mechanism. Each delivery block indicates a delivery time or delivery time range, which is presented to the sender. Delivery block A (GUI element 224) is to deliver a message between 4 and 5 o'clock that day. A sender may select a specific time within that range if desired, otherwise the system defaults to the first available delivery time. A different block as shown by element 228 can specify a delivery at a relative time, such as five minutes before scheduled rounds (by a selected physician/group indicated by GUI element 210) for a specific patient (selected by element 216). A time estimate, subject to change, is presented that apprises the sender of an estimated or scheduled absolute time corresponding to the relative time. If a server-based system that maintains schedule for physician's to meet with patients is updated, the relative time updates automatically. Selection of a delivery time or delivery block through GUI element 230 results in presentation of the screen shown in FIG. 2C.

Figure 2C:
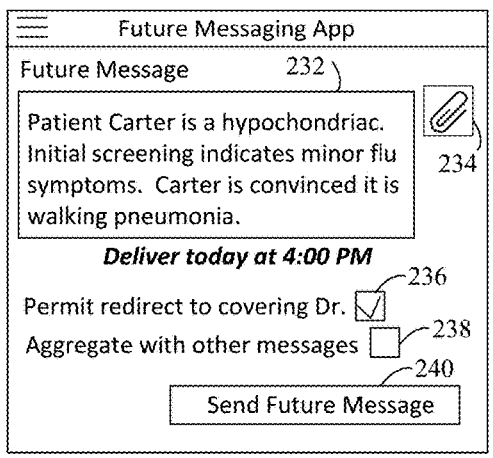

FIG. 2C shows a user interface that permits a sender to provide content for a future message to be delivered at a future time. The sender can enter content via typing, recognized speech entry, or other means into GUI element 232, which displays textual or other content to be conveyed. Additional files, images, and media are able to be attached through GUI element 234, in one embodiment. In another, real-time capture of voice messages, images, or video can occur via a mobile device upon which the future messaging application runs and can be included as message content. A number of options for controlling the future message handling may also be explicitly elected, or may be changeable from a settings window. In one embodiment, for example, a sender may permit/deny their sent message to be redirected in a professional context, as expressed by GUI element 236. As shown, in a physician context, a message about a patient (element 216) between doctors may be conveyed to other doctors covering for the receiving physician, or not. This option exists as some inter-physician messages, especially those that are casual, are restricted to an interpersonal relationship. Others are directed to any handling physician. For example, a physician may craft an informal future message to a specific doctor; trusting the message is going to be received and understood as intended by the recipient. A different recipient may require more extensive message or background be conveyed to be properly understood, which is one good reason to restrict the message sent to a specific physician. In one embodiment, when a physician changes or a change is desired, the sender may be alerted so that the future message is able to be altered for consumption by the new recipient before delivery. In another embodiment, the sender can expressly permit their message to be aggregated with other "future" messages, as indicated by GUI element 238. Further, a future message delivery may be contingent on a set of conditions, which relate to aggregation. For example, a physician can provide brief commentary on a patient X-ray to be delivered in as part of a future message along with the delivery of a picture of the X-ray. A nurse or other medical assistant may be responsible for creating the message of the picture of the X-ray that is to be delivered in aggregation with commentary at a designed future time. Selection of interface element 240 causes the future message to be sent to the future messaging server.

Figure 2D:
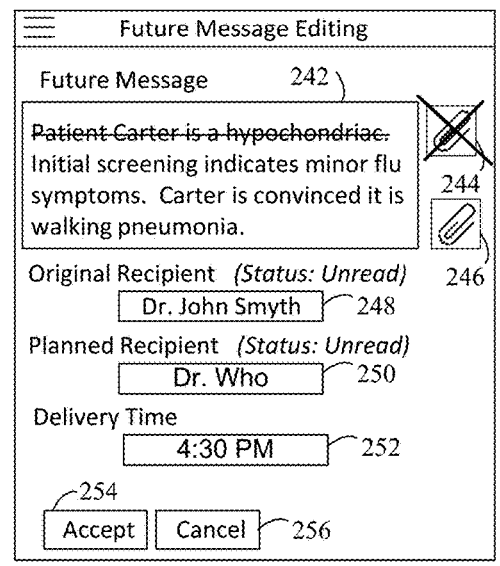

FIG. 2D shows a user interface that permits a sender or an agent of the sender to edit a future message before it is delivered to a recipient. An agent is an assigned person or set of people that the original sender authorizes to edit future messages before delivery. For example, a physician's administrative assistant may be provided authority to edit a draft version of a message before the future delivery time occurs. This editing can change the content of the message, such as through GUI element 242 editing, or can permit additional content to be added/appended. The original sender may also perform these actions. Original attachments may be deleted (see GUI element 244) and additional attachments added (see GUI element 246). An original recipient may be shown (see GUI element 248) along with a status indicating whether that recipient has or has not read the future message (before the time of delivery occurs). A future message may be routed for handling to someone other than the original recipient, which is indicated in GUI element 250 along with a read status. A not-yet-delivered future message shows a delivery time, which is able to be edited, as expressed by GUI element 252. The future message itself may be deleted (or retracted) before delivery. Changes made via the edit screen may be accepted 254 or discarded 256.

Figure 3A:
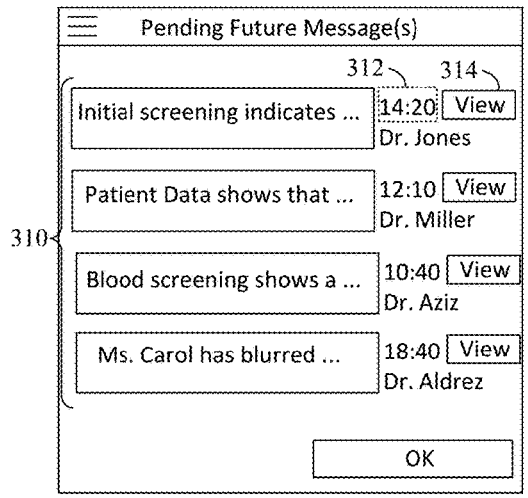
FIGS. 3A, 3B, 3C, and 3D shows a set of recipient user interfaces for a future messaging application in accordance with an embodiment of the disclosure.

FIGS. 3A, 3B, 3C, and 3D show a sender's user interface for a future messaging application in accordance with an embodiment of the disclosure. FIG. 3A shows a future message section for a recipient's user interface. The future message section is distinct from a typical message section and permits "pending" messages to be delivered at a later time to be viewed. Generally no alert or other attention grabbing notification will be provided to the recipient, which indicates a new future message is viewable in order to minimize recipient distractions. Future messages 310 indicate who sent them and notify the recipient of a set delivery time 312. In another embodiment, a time the future message can also be shown or may be used as an alternative to the set delivery time 312 (i.e., future delivery time). If desired, the recipient can view 314 a future message, which results in a user interface such as that of FIG. 3B being presented.

Figure 3B:
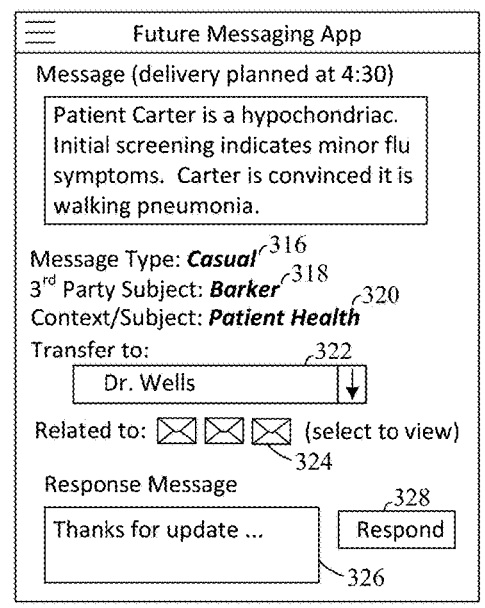

FIG. 3B allows a recipient to view content of a future message before the delivery time. Attachments, media, and other content are viewable. Viewing the future messages is recorded at the server and a sender is informed of the early viewing in embodiments. Additional content for the future message is also viewable, such as viewing a message type 316, a subject 320, a context 320, and other sender designated conditions and contextual information, such as a third party identity 318. The recipient is also able to transfer the future message to another for delivery at the delivery time, as noted by element 322. For example, if a recipient physician is planning to have a different physician in his/her practice cover for a patient, for whom the future message is directed. Related messages, which may be delivered ones or future messages are indexed to the viewed future message and are viewable, as indicated by GUI element 324. If desirable, the viewer of the future message may respond before the delivery time, as indicated by GUI elements 326 and 328.

Figure 3C:
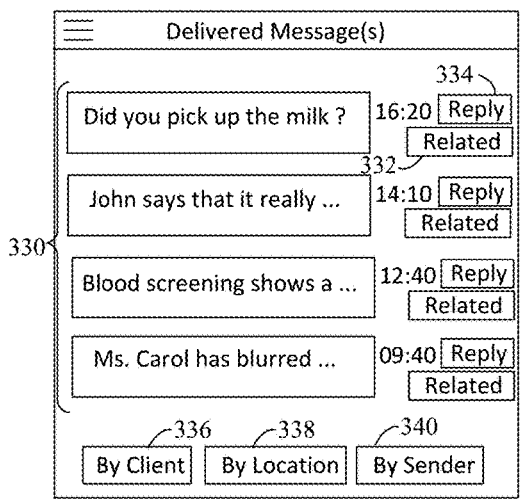

Delivered messages are viewable under a message section of the user interface, as shown by FIG. 3C. After the delivery time specified in a future message, the message appears at the delivery time within the message section of FIG. 3C and disappears from the future message user interface sections, such as those shown in FIGS. 3A and 3B. The message section of the user interface shows a set of message 330 that have been delivered. A user interface element 332 permits users to view related messages to a corresponding one, if any. A user may also reply to a received message, as shown by GUI element 334. By default, messages may be shown by date, with the most recently received being shown in the top-most order positions. Additional options to short and filter messages are contemplated, as are mechanisms to search for messages by sender, topic, key words, and the like. GUI element 336 explicitly shows that messages can be sorted by a patient or client. GUI element 338 indicates that messages can be sorted or filtered by location. Location based searches can be particularly useful for physicians seeing many patients at a hospital or other location. GUI element 340 permits a sorting or filtering of messages by sender. A message shown in FIG. 3C can be selected or expanded, such as through a GUI screen as shown in FIG. 3D.

Figure 3D:
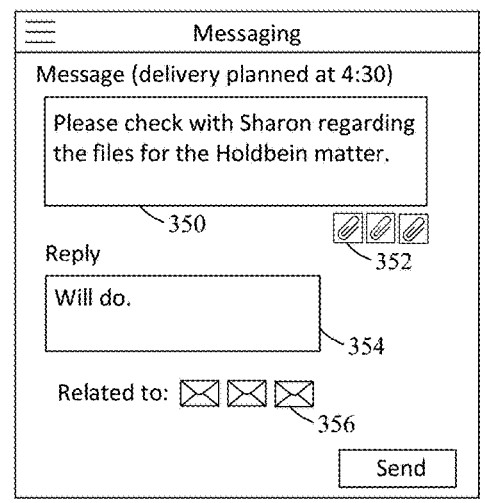

FIG. 3D shows that for a given message, the message content is displayable in GUI element 350. Attachments and related media may also be indicated, as shown by GUI element 352. In one embodiment, fly-over windows or popup screen is presented for attachments and other items. GUI item 354 shows that a recipient is able to reply to the sender by providing content. Additionally, a set of related messages to the expanded message are displayed, as indicated by GUI item 356. Related messages can include delivered and future messages that have been created though not yet delivered.

It should be appreciated that the illustrative graphical user interfaces pictorially represent one contemplated implementation for future message functionality. The invention is not to be construed as limited to the GUI controls, the arrangements, and/or the features shown. Instead, one of ordinary skill recognizes that derivatives based on known message related conventions are within scope of the disclosure and that the specific interfaces shown are to illustrate the concept of future messaging as elaborated upon herein.

Figure 4A:
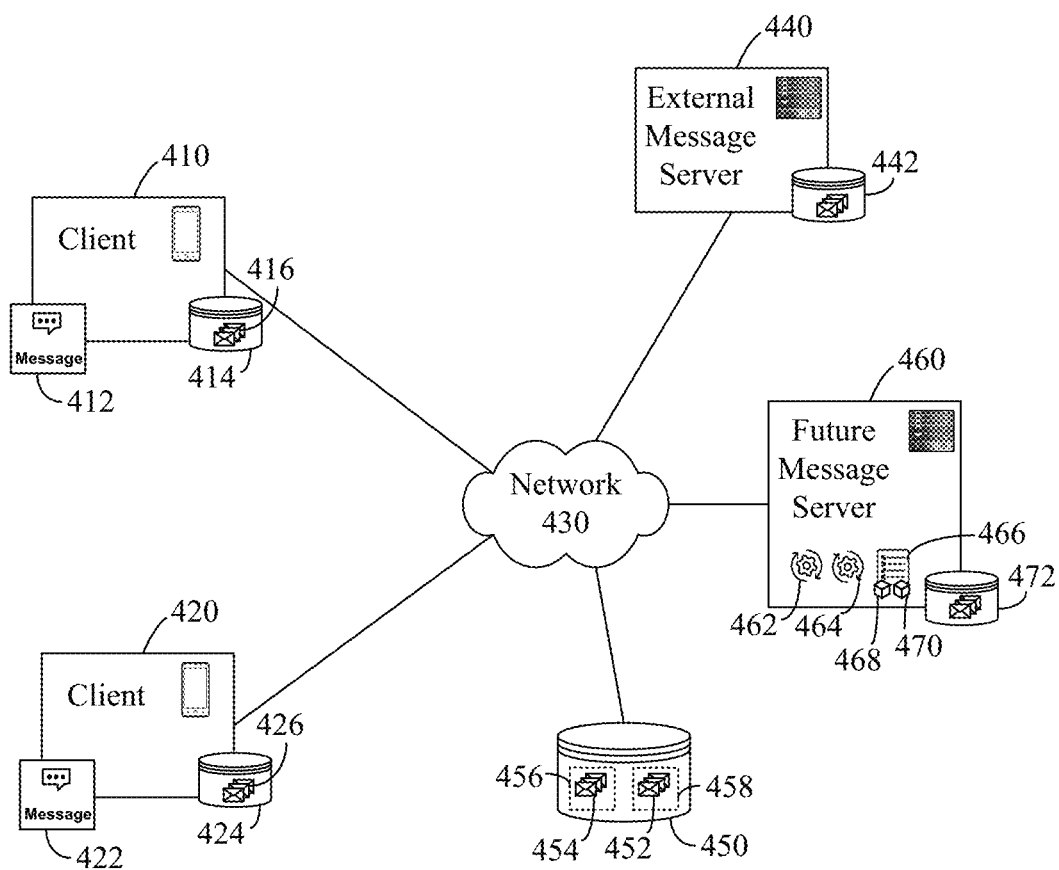
FIG. 4A shows a block diagram of a system for implementing future messaging in accordance with an embodiment of the disclosure.

FIG. 4A shows a block diagram of a system for implementing future messaging in accordance with an embodiment of the disclosure. FIG. 4B provides details for a delivery block 405, a future message list 435, and message specific settings 455. In FIG. 4A, a message sending client 410 is communicatively linked by network 430 to a message receiving client 420, a future message server 460, message data store 450, and an external message server 440. Client 410 and 420 have a future message application 412 and 422 installed thereon. The interfaces of FIGS. 2A-D and 3A-D illustrate user interfaces and functionality available through applications 412 and 422. When a future message is created by client 410 it is sent through network 430 to be stored in data store 450 as one of many future messages 454 in a future message storage space 456. Delivered messages 452 may also be persisted in data store 450 in a message storage space 458, which is distinct from space 456. The future message server 460 processes future messages 454 using a set of processing rules 462, time availability rules 464, and a future message list 466 having a defined set of delivery blocks 468 and 470. At a designated time of delivery, a future messages 454 become normal messages 452, which is delivered. At a time of delivery, a message is delivered over the network 430 to the intended recipient. Delivered messages may be stored on a local data store of a receiving client 420, as a stored message 426. The future message server 460 may use one or more external message servers 440 to deliver messages to receiving clients. These external deliveries can be for messaging applications, which are distinct from future messaging application 422, and which may lack any application-specific future messaging features. Delivery from an external message server 440 can be a configurable alternative to a delivery from server 460 or can occur in addition to message delivery from server 460 to messaging application 422.

In one embodiment, messages send and received from clients 410 and 420 need not be delivered and received on a one-to-one basis. Group messages sent to multiple destinations are contemplated. Professional messages conveyed to a group or to a service entity are able to be routed to suitable recipients that can be determined based on context. These determinations may be static or dynamically determined. Some messages conveyed between clients are automatically deleted from all data stores (local and remote) in accordance with conditions established by the sender, recipient, future message server conventions, or a combination thereof. Conveyed messages can also conform to state and federal regulations, such as HIPA standards. Messages may be encrypted and can also be conveyed over encrypted and secured communication channels in contemplated embodiments.

In one embodiment, future messages are intentionally absent from local data stores, especially that of a recipient. That is, although viewable using a future messaging application 422 interface, the future messages are security stored on at a data store 450 accessible over network 430. By not delivering future messages to sender's local data store, privacy of future messages is ensured. Further, limited local storage space is not consumed. Consequently future messages are designed to minimize unnecessary computing resource expenditures on local devices as well as minimizing distractions to the users of recipient devices all while maximizing functionality available to users.

External message server 440 can be a message server lacking any specific future messaging functionality. Examples of external message servers 440 include email servers, text messaging serves, SMS servers, chat servers, social networking servers, RSS feed servers, Voice over Internet Protocol (VoIP) servers, fax servers, and the like. An external message server 440 may permit bidirectional communication between two or more people in real-time or near-real time in embodiments. In one embodiment, delivery rules 464 established on future message server 460 can specify any quantity and type of external message servers 440 that are directed to delivery message 428 at the specified time. The ability to deliver future messages 454 using external message servers 440 provides a means for easily integrating future message capabilities into legacy infrastructures and tools as preferred by senders and recipients.

One recipient may commonly check their personal text messages via their mobile phone, yet may not generally disclose the personal text message account for business reasons. Such a person is able to establish conditions upon which future messages are delivered to this private account. Doing so ensures the recipient's privacy is maintained and that the recipient is not overwhelmed or overly distracted with messages. Having this assurance created through the recipient established communication restrictions and conditions via future messaging functionality, communication avenues to rapidly convey information to a recipient are made available.

The processing rules 462 and time availability rules 464 are processes of the future message server 460 implemented in software or firmware. The processing rules 462 performs context related associations, facilitates information entry, automates formalizing of message content, performs complex routing of message, and provides features for professional message domains. In one embodiment, the processing rules 462 track all physicians and medical personal assisting with care of a particular patient, and coordinate messages among these professionals. This level of coordination may require integration with a number of other external systems, such as those of a hospital, those of various physicians, insurance companies, labs, and the like. A variety of complex rules are able to be established to ensure the processing flow of professional organizations is seamless. In one embodiment, messages from external systems can be automatically sent to appropriate professionals via in the future message system. In embodiments, the processing rules 362 can implement artificial intelligence, neural networks, and heuristics to automatically suggest information (such as a patient-specific message or portions thereof, as well as message types, and context/subjects) to minimize human time spent manually entering information. If a physician sends a future message based mentioning an X-ray for a specific patient, one of the processing rules 462 can seek the noted X-ray, determine availability, and ask the physician if the X-ray should be included in the message as an attachment. The processing rules 462 can advantageously utilize the time delta between future message creation and delivery to perform computationally expensive processes on content of a future message, which produces suggestions or enhancements to the future messages before delivery. For example, if a future message is to be sent from an English speaking sender to a Japanese speaking recipient, message content is translated between languages automatically by processing rules 462 in one embodiment.

The time availability rules 464 are a set of rules that take advantage of information content present in the delivery block 405, the future message list 435, and the message specific settings 455 to implement future messaging specific functionality. Time availability rules 464 and processes permit the establishment of delivery blocks 405 by a recipient. These delivery blocks 405 inform recipients of when a future message may be delivered. A delivery block 405 includes a block identifier 411 that is a unique key as well as a block name 413, which is an alias for a specific delivery block like "Evening Delivery" or "Round Delivery". An absolute time, an absolute time range, or a relative time (relative to a time conditioned computing resource per rules 464) is recorded in a time element 415. A set of days of the week 417 for which the delivery time is available is specified. For example, the time 415 can be available only on Monday, Tuesday, Wednesday, and Friday per setting. Other days of the week or month are configurable. A reoccurring section 419 indicates whether the time 415 repeats for the delivery block 405 or is cyclically repeating. Sender conditions 421 provide specifics, conditions, and constraints related to the sender to which the delivery block 405 applies. Recipient conditions may override sender conditions 421 in the event of a conflict. For messages involving 3rd parties, third party conditions 423 are also established. As shown, the condition placed on the third party is that the sender physician and a recipient physician (or their groups) shares a patient. When a patient specified isn't shared, the delivery block having that condition is not made available for future message delivery. One or more conditions are also able to be placed on the delivery block for a given context/subject 427. For example, a context for a delivery block 405 could be restricted to a "patient health" context, where other conditions would not permit the delivery block 405 to be available for a given message. Text content conditions 429 are also specified, which restricts/permits delivery block availability based on keywords present/absent in the message. Appendix conditions 431 restrict availability of the delivery block based on a presence/absence of a particular type of attachment or appendix. As shown, the delivery block 405 is only available when an attachment with a patient's chart is attached to a future message.

Future message list 435 provides configurable data elements the control the delivery behavior of future messages. A unique list identifier 437 is included as is a list scope 439. List scope 439 represents meets and bounds for which a specific message list 435 configuration applies. Different medical service groups, different professions, types of senders, recipients, and the like can each have its own future message list associated. A default delivery address or set of delivery addresses 441 is stored that controls message routing behavior. As shown, a specific medical group indicates their generalized preferences for delivery of future messages applicable to all physicians in the group. Additional forward defaults 443 are configured for the message list with information specifics. For example, many recipients check their personal text messages more than they will check other message sources so message delivery for professional messages may also default to a personal text message application. Each individual physician, in a group, will have their own address, which is configured. Further, individual physicians may override the group defaults in embodiments. Element 445 is a data configuration for enabling/disabling read receipts for future messages that are viewed before delivery. Additional configurations for read receipts on delivered messages are also contemplated. Item 447 provides constraints, conditions, behavior for any default read conditions. For example, if a delivered message is not read within 1 day of delivery, an "escalation" process can be triggered to ensure some professional in the group pays attention to the professional message. Automatic delete defaults for future and delivered messages 449 are configurable for a specific future message list 435. Additional rules, which may be customized rules 451 written for a particular list 435 are contemplated. Various script languages, program languages, and GUI based tools may be available for creating the customized rules in contemplated embodiments.

Message specific settings 455 establish configurable rules/settings that override higher level defaults for a particular message. Conflict resolution rules (part of processing rules 462 and/or time availability rules 464) are established by the future message server 460 to resolve conflicts. The settings 455 include a message identifier 457 and a set of sender 459 specific message settings and a set of recipient 467 specific message settings. The sender specific settings 459 include a delivery address constraint 461. For example, if a sender specifies that only the recipient is able to receive a message other defaults permitting routing are disabled. A different setting would still permit routing to others, but would require permission/expressed authorization from the sender. A replies 463 setting can restrict whether a sent message is able to be forwarded to others. It is common for people to add non-sender recipients to a communication string, which includes sent content. This setting can permit the sender a higher level of control with regard to message replication beyond an initial set of recipients. Autodelete criteria 465 for a sender's message can be established, such as immediately deleting a future message after it is viewed, in one instance. Recipient's may provide additional forwarding options 469, such as specifying all messages to be conveyed to a particular email address unless other constraints on the delivery behavior prevent such a forward. Custom rules 471 are also available to both the sender and the recipient, which are similar in nature to list custom rules 451. Since the future message server 460 may not be able to control post-delivery behavior of an outside system (i.e., external message server, non-application 422 delivery target) constraints on post-delivery handling of a message may restrict whether that message is conveyable through an external messaging server 440 and/or to specific client running message applications.

The details present in the delivery block artifact 405, the future message list artifact 435, and the message specific setting artifact 455 are provided for illustrative purposes and to demonstrate that low level specifics for implementing complex delivery rules are contemplated herein. The disclosure is not to be limited in scope to the specific data elements, structures, and rules detailed herein. Instead, one of ordinary skill recognizes that derivatives and alternatives are contemplated which have equivalent or similar functionality with respect to future messages to those explicitly expressed herein.

Clients 410 and 420 and servers 440 and 460 are computing devices that include one or more processors, circuitry, operating systems, programs, firmware, and other such components. The clients 410 and 420 may be mobile communication devices, such as mobile phones and tablets. Clients 410 and 420 may also be personal computers, notebook computers, wearable devices, or home entertainment devices. Servers 440 and 460 may be discrete computing devices or a set of distributed computing devices that together perform a defined and controlled set of computing functions.

Data stores of clients 410 and 420, servers 440 and 460, and/or data store 450 can be a hardware/software component able to persist information stored therein. Each data store is a non-transitory storage medium or collection of storage mediums. Data stores can be a Storage Area Network (SAN), Network Attached Storage (NAS), a local storage medium, and the like. Data stores can conform to a relational database management system (RDBMS), object oriented database management system (OODBMS), a flat file storage system, and the like. Data stores can be communicatively linked to servers and clients in one or more traditional and/or proprietary mechanisms. In one instance, data stores include components of Structured Query Language (SQL) complaint database.

Network 430 can be an electrical and/or computer network connecting one or more system components. Network 430 can include, but is not limited to, twisted pair cabling, optical fiber, coaxial cable, and the like. Network 430 can include any combination of wired and/or wireless components. Network 380 topologies can include, but is not limited to, bus, star, mesh, and the like. Network 430 types can include, but is not limited to, Local Area Network (LAN), Wide Area Network (WAN), VPN, a personal area network (PAN), an adhoc network, a peer-to-peer network, a client-server network, and the like.

Figure 5:
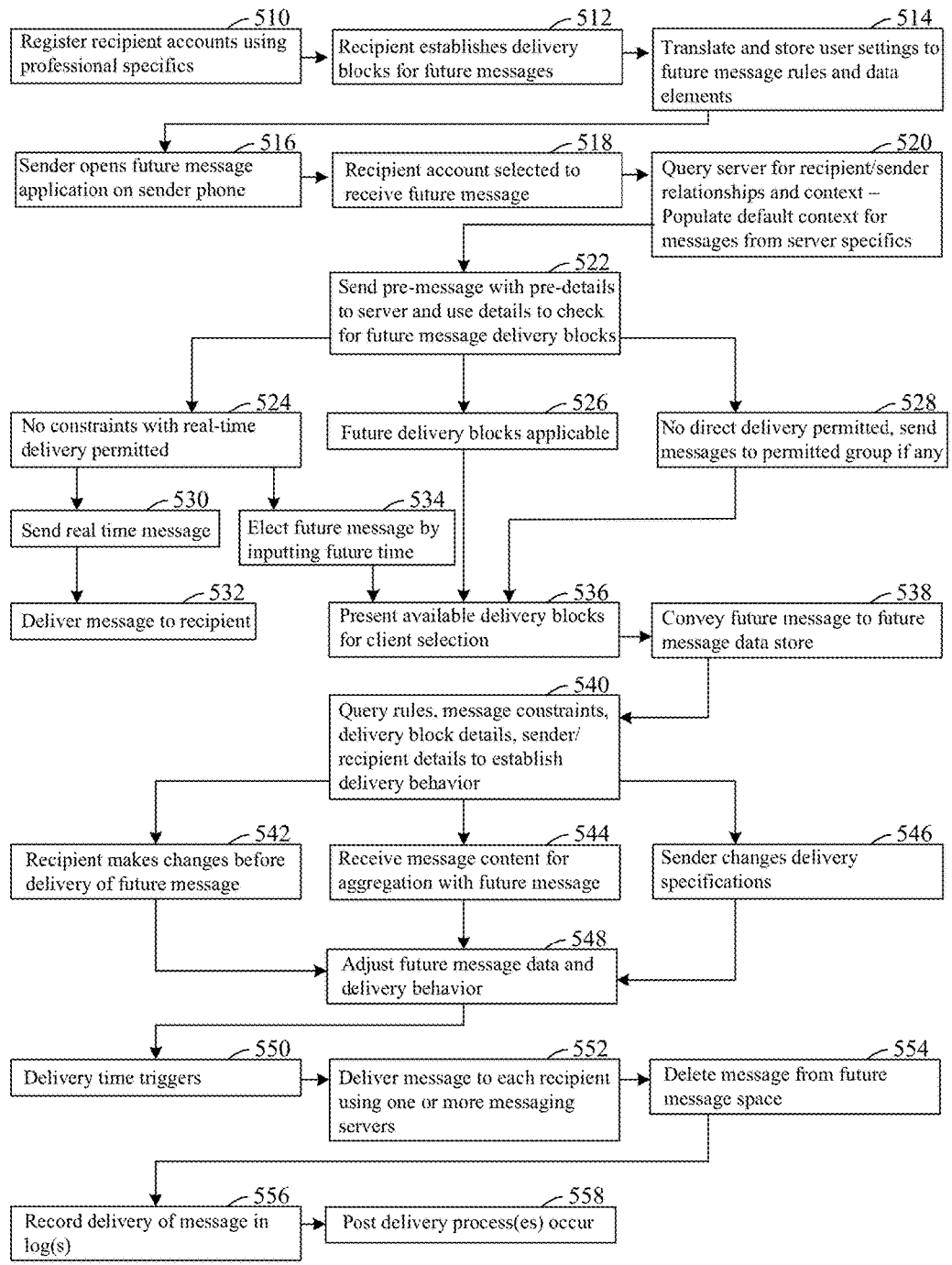
FIG. 5 shows a flow chart for a future messaging process in accordance with an embodiment of the disclosure.

FIG. 5 shows a flow chart for a future messaging process in accordance with an embodiment of the disclosure. In step 510, recipients and senders register with a future messaging server providing any professional service specifics that apply to them. For example, each physician may specify the medical group with which they work, provide a set of hospitals that they are authorized to perform rounds at, provide access to external systems to enable some level of patient lists to be shared or accessed, and the like. Different professionals will have different rules associated with them for future messages and for message delivery behavior. IN step 512, a recipient establishes a set of delivery blocks and their specifics to establish delivery times at which future messages are authorized. The settings provided by users, such as a sender or recipient, may need to be translated or converted into lower level details used by the future message system (such as translating high-level settings to the artifact specific details of FIG. 4B). In step 514, user settings can be translated and established within the future message server as proper messaging rules and elements.

In step 516, a sender opens a future messaging application, which may be running on the sender's phone. In step 518, the sender can specify a recipient account to which a message being constructed is to be delivered by the future messaging server. In order to determine which message delivery blocks are appropriate or available, a future message server may need to be queried. Step 520, queries the future message server for recipient/sender relationship details and context that affects future message delivery behavior. In one embodiment, a sender's interface can be automatically populated (by defaults) based on results of this query. For example, if the sender/recipient are both recipients that share one patient and the sender items indicate the message is professional; specifics for that patient can be pre-populated on the sender's interface; subject to sender change. In step 522, the sender can confirm details for the message and send these details to the future message server. These confirmed details are used to determine message delivery times and options that are available.

As shown by step 524, the server can determine that there are no delivery constraints and that a message is able to be immediately delivered. The sender may still elect to enter an open time for future message delivery, as shown by step 534. Otherwise, a message can be sent in real time (step 530) and delivered to the recipient (step 532). Results from step 522 may determine that immediately delivery of a message is not available, and that a set of delivery blocks for future messages are available (step 526). If so, the delivery blocks available are presented to the sender via a user interface for selection (step 536). The selection by the user determines a future delivery time for a future message. Results from step 522 may indicate that for the given sender/recipient no delivery blocks are available for direct communication of a future message. A common situation where this may occur is some physicians may not permit direct messages from many patients, yet these messages entered by a patient sender are still desired. A sending option for a different person (other than the selected sender) may be provided (step 528). This different person may be a call center, an administrative system, or other such person (as configured by the rules of the future message server).

Assuming a future message and message time is established by the process content and specifics of such a message are added by the sender. The future message is conveyed to the future message server to be stored in a future message space of a networked data store (step 538). In step 540 after storing the future message, rules, message constraints, delivery block details, sender/recipient details can be queried to establish or constrain delivery behavior. Computationally expensive actions (such as translating content, performing image analysis and finding related content, and the like) can be performed in the background when computing cycles are available. Since the future message is not delivered, latency issues for these expensive processes are not a significant factor. A number of actions may occur between future message establishment and a delivery time. For example, a sender may retract, delete, change, future message content as indicated by step 542. Additional content or messages may be received (by the sender or others) that are to be aggregated with the future message which occurs at step 544. The recipient of the future message may change his/her delivery specifics, delivery block details, or other future message settings that affect the pending delivery, as indicated by step 546. Reading or pre-viewing the future message by the recipient may also change delivery behavior at step 546. Each time a delivery affecting change occurs (steps 542, 544, or 546) the future message delivery data and/or delivery behavior are changed as indicated by step 548.

A current time eventually matches the delivery time, at which point the delivery of the future message triggers (step 550). Once triggered, the delivery message is delivered to each designated recipient using one or more message delivery servers to one or more application destinations/accounts (step 552). In step 554, the deleted message is deleted from the future message space so that the future message is no longer stored. If any local storage spaces exist that had a copy of the future message, each is updated to either delete the future message or to change it to a delivered one. In step 556, delivery of the message is recorded in a log of each message delivery server involved. In step 558, post-delivery processes occur for the delivered message.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A messaging server with future messaging functionality that minimizes recipient distractions comprising:

at least one processor, circuitry, and a non-transitory storage medium;

the non-transitory storage medium comprising a future message storage space for a plurality of future messages, wherein each future message is a sender created message not yet delivered to a recipient that has an associated sender specified message delivery time;

the processor and circuitry configured to permit a set of recipients, including the recipient—each recipient of the set having a message account for a future message server, to specify recipient specific delivery block details for a set of delivery blocks for future messages, wherein the non-transitory storage medium stores the recipient specific delivery block details indexed against a respective one of the recipients, wherein each recipient is a physician or health care provider;

the processor and circuitry configured to provide a set of senders of future messages with a subset of the delivery blocks applicable to a message to be sent from the respective senders based on the delivery block details as established by the respective one of the recipients;

the processor and circuitry configured to receive, process, and store the future message and other similar future messages, each having the sender specified message delivery time consistent with a respective time detailed by one of the recipient specific delivery blocks, wherein before delivery of each of the future messages a recipient is able to view content of the future message via the future message server, wherein until the respective sender specified message delivery time a respective one of the set of senders is able to retract and edit a corresponding one of the future messages; and the processor and circuitry configured to detect an occurrence of time matching the sender specified message delivery time for each of the future message and to responsively delivery each future message at the sender specified message delivery time to an account of the respective recipient; wherein delivery of each future message results in the respective future message being deleted from a section of the non-transitory storage medium for future messages, wherein after delivery of each future message the respective one of the set of senders is unable to retract and edit a corresponding delivered message, wherein the future messaging server is configured to determine based on the set of delivery blocks that no direct messages are permitted from the sender to the recipient and to provide an alternative recipient to which a corresponding one of the future messages is able to be delivered, wherein the sender is a customer of a professional service provided by the sender and wherein the alternative recipient is an administrative assistant of the sender, and wherein each of the future messages are contextually related to professional services between the sender and recipient, wherein availability of the set of delivery blocks depends on message content specific to the professional services for which corresponding ones of the future messages relate.

2. The messaging server of claim 1, wherein the sender specified message delivery time for at least a portion of the future messages is a relative time based upon a recipient dependent action recorded in a recipient specific data store independent of the future message server, which the future message server later utilizes to compute an absolute time for the sender specified message delivery time.

3. The messaging server of claim 1, wherein one of the set of delivery blocks comprises a constraint that is dependent upon a sender professional relationship as compared by the future message server to a corresponding recipient specific professional relationship.

4. The messaging server of claim 1, wherein the future messaging server is configured to determine based on the set of delivery blocks that no delivery blocks are defined for a given future message and is further configured to permit the sender to enter the sender specified message delivery time for delayed delivery of a corresponding one of the future messages.

5. The messaging server of claim 1, wherein the future messaging server is configured to discover a third party specified for one of the future messages, wherein applicable ones of the set of delivery blocks are determined by the future messaging server based on a professional relationship both the sender and recipient have with the third party.

6. The messaging server of claim 1, wherein a user interface of the sender sorts received messages from the future message server based on time of delivery by default, wherein the user interface does not alert the recipient of the future message existence until delivery of a corresponding message at the sender specified message delivery time, at which point the sender is alerted via the user interface.

7. The messaging server of claim 1, wherein the future messaging server delivers messages at the spender specified delivery time to a future messaging application of a device of the corresponding recipient, wherein the future messaging server is configured to deliver a subset of the messages to an external messaging server independent of the future messaging server, wherein the external messaging server delivers the subset to a second messaging application of the device, wherein the external messaging server and the seconding messaging application each lack future messaging functionality.

8. The messaging server of claim 1, wherein the future messaging server is configured to:
detect an action from within a user interface of a sender's device for sending a real-time message to an recipient message account of the recipient;
responsive to detecting the action, query a future message list of the future message server for the recipient message account;
responsive to determining from the future message list that the recipient message account is not restricting receiving times for the recipient message account, receive a message entered via the user interface and immediately delivering the message to the recipient message account with a delivery timestamp for a time of the immediate delivery; and
responsive to determining from the future message list that the recipient message account is not restricting receiving times for the recipient message account to:
A) determine a set of one or more future message times, each representing a significant delivery delay and each established by an account holder of the recipient message account;
B) receive a future message entered via user interface, which specifies a future delivery time selected by a sender via the user interface based on a selection of one of the one or more future message times;
C) send the message to a future message storage space for the recipient message account, wherein the future message once sent is viewable by the account holder as a future message within a specialized area of a recipient user interface that provides access to the recipient message account; and
D) responsive to a current time being equal to the future delivery time, remove the future message from the future message storage space and delivering the message to the recipient message account with a delivery timestamp of the future delivery time.

9. A non-transitory storage medium of a mobile device having a processor, circuitry, and an operating system, said storage medium comprising:
code executed by the at least one processor and circuitry configured to create and receive a plurality of future messages, wherein each future message is a sender created message not yet delivered to a recipient that has an associated sender specified message delivery time;
code executed by the at least one processor and circuitry configured to permit a set of recipients, including the recipient—each recipient of the set having a message account for a future message server, to specify recipient specific delivery block details for a set of delivery blocks for future messages, wherein each recipient is a physician or health care provider;
code executed by the at least one processor and circuitry configured to establish a subset of the delivery blocks;
code executed by the at least one processor and circuitry configured to send and receive the future message and other similar future messages, each having the sender specified message delivery time consistent with a respective time detailed by one of the recipient specific delivery blocks, wherein before delivery of each of the future messages a recipient is able to view content of the future message via the future message server, wherein until the respective sender specified message delivery time a respective one of the set of senders is able to retract and edit a corresponding one of the future messages; and
code executed by the at least one processor and circuitry configured to responsively receive delivery of each future message at the sender specified message delivery time to an account of the respective recipient, wherein delivery of each future message results in the respective future message being deleted from a section of the non-transitory storage medium for future messages, wherein after delivery of each future message the respective one of the set of senders is unable to retract and edit a corresponding delivered message, wherein the future messaging server is configured to determine based on the set of delivery blocks that no delivery blocks are defined for a given future message and is further configured to permit the sender to enter the sender specified message delivery time for delayed delivery of a corresponding one of the future messages, and wherein each of the future messages are contextually related to professional services between the sender and recipient, wherein availability of the set of delivery blocks depends on message content specific to the professional services for which corresponding ones of the future messages relate.

10. The non-transitory storage medium of claim 9, wherein the spender specified message delivery time for at least a portion of the future messages is a relative time based upon a recipient dependent action recorded in a recipient specific data store independent of the future message server, which the future message server later utilizes to compute an absolute time for the sender specified message delivery time.

11. The non-transitory storage medium of claim 9, wherein one of the set of delivery blocks comprises a constraint that is dependent upon a sender professional relationship as compared by the future message server to a corresponding recipient specific professional relationship.

12. The non-transitory storage medium of claim 9, wherein a user interface of the sender sorts received messages from the future message server based on time of delivery by default, wherein the user interface does not alert the recipient of the future message existence until delivery of a corresponding message at the sender specified message delivery time, at which point the sender is alerted via the user interface.

13. The non-transitory storage medium of claim 9, wherein the future messaging client application is configured to:
   detect an action from within a user interface for sending a real-time message to a recipient message account of the recipient;
   responsive to detecting the action, query a future message server for the recipient message account;
   responsive to determining from the future message list that the recipient message account is not restricting receiving times for the recipient message account, receive a message entered via the user interface and immediately delivering the message to the recipient message account with a delivery timestamp for a time of the immediate delivery; and
   responsive to determining from the future message list that the recipient message account is not restricting receiving times for the recipient message account to:
A) present a set of one or more future message times, each representing a significant delivery delay and each established by an account holder of the recipient message account; and
B) send a future message entered via user interface, which specifies a future delivery time selected by a sender via the user interface based on a selection of one of the one or more future message times, wherein a recipient's device receive the message to a future message storage space for the recipient message account, wherein the future message once received is viewable by the account holder as a future message within a specialized area of a recipient user interface that provides access to the recipient message account, and wherein responsive to a current time being equal to the future delivery time, the future message is removed from the future message storage space and is received at the recipient message account with a delivery timestamp of the future delivery time.

14. A method for future messaging that minimize distractions comprising:
   detecting an action from within a user interface of a sender's device for sending a real-time message to a recipient message account, wherein the recipient message account is an account for a physician or health care provider;
   responsive to the detecting, querying a future message list of a future message server for the recipient message account;
   responsive to determining from the future message list that the recipient message account is not restricting receiving times for the recipient message account, receiving a message entered via the user interface and immediately delivering the message to the recipient message account with a delivery timestamp for a time of the immediate delivery,
   responsive to determining from the future message list that the recipient message account is not restricting receiving times for the recipient message account:
A) determining a set of one or more future message times, each representing a significant delivery delay and each established by an account holder of the recipient message account;
B) receiving a future message entered via user interface, which specifies a future delivery time selected by a sender via the user interface based on a selection of one of the one or more future message times;
C) send the message to a future message storage space for the recipient message account, wherein the future message once sent is viewable by the account holder as a future message within a specialized area of a recipient user interface that provides access to the recipient message account;
D) responsive to a current time being equal to the future delivery time, removing the future message from the future message storage space and delivering the message to the recipient message account with a delivery timestamp of the future delivery time, wherein the future messaging server is configured to determine based on the set of delivery blocks that no direct messages are permitted from the sender to the recipient and to provide an alternative recipient to which a corresponding one of the future messages is able to be delivered, wherein the sender is a customer of a professional service provided by the sender and wherein the alternative recipient is an administrative assistant of the sender, and wherein each of the future messages are contextually related to professional services between the sender and recipient, wherein availability of the set of delivery blocks depends on message content specific to the professional services for which corresponding ones of the future messages relate.

15. The method of claim 14, further determining whether the recipient message account is or is not restricting the receiving times is dependent upon a sender professional relationship as compared by the future message server to a corresponding recipient specific professional relationship.

16. The method of claim 14, wherein the future message defines a third party, wherein determining whether the recipient message account is or is not restricting the receiving times is based on a professional relationship both the sender and recipient have with the third party.

* * * * *